3,165,392
METHOD OF DESTROYING UNDESIRED PLANT LIFE
Harmannus Koopman, Weesp, Netherlands, assignor to North American Philips Company, Inc., New York, N.Y., a corporation of Delaware
No Drawing. Filed Apr. 27, 1960, Ser. No. 24,893
Claims priority, application Netherlands, Apr. 28, 1959, 238,686; Dec. 30, 1959, 246,932
7 Claims. (Cl. 71—2.3)

Applicant has found that benzaldoximes and acyl derivatives thereof substituted in the nucleus by halogen or by halogen and lower alkyl groups affect the growth of plants. This holds in particular for derivatives of 2,6-dichlorobenzaldoxime.

In addition, applicant has found that of the benzaldoximes and the acyl derivatives according to the invention stereo-isomers exist which may be considered as cis- and trans-isomers. Which isomer is formed, depends on the process according to which an oxime is prepared.

For example, the known 2,6-dichlorobenzaldoxime of melting point 148–150° C. was obtained from 2,6-dichlorobenzaldehyde by reaction with hydroxylamine. The new acetyl derivative of this oxime, prepared therefrom by heating with acetic acid anhydride, has a melting point of 46.5–48° C. Applicant assumes an oxime obtained by reaction of a benzaldehyde with hydroxylamine and the acyl derivatives prepared therefrom to have the trans-configuration. Oximes and the acyl derivatives thereof prepared according to this process will be designated as α-oximes (α-isomers).

Applicant obtained a new 2,6-dichlorobenzaldoxime of melting point 175–176° by reaction of 2,6-dichlorobenzaldehyde with sodium hydroxylamine disulphonate; the new acetyl derivative thereof has a melting point of 73–85° C. (while splitting off acetic acid). Applicant assumes these compounds and other benzaldoximes prepared by reaction of benzaldehydes with a hydroxylamine monosulphonate or disulphonate and the acyl derivatives of those oximes to have the cis configuration. Oximes and acyl derivatives thereof thus prepared will be designated below as β-oximes (β-isomers).

The invention relates to new derivatives of benzaldoximes, to the production thereof, to preparations for effecting the growth of plants having one or more of those derivatives as active constituent, to the production of those preparations and their use.

This invention relates to new derivatives of benzaldoximes of the general formula

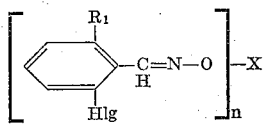

(I)

in which Hlg represents halogen and preferably chlorine, $R_1$ halogen and preferably chlorine or an alkyl group having 1 to 6 carbon atoms and preferably a methyl group and X represents hydrogen or an acyl group and $n=1$, whereas $n$ may be 2 if X is the acyl radical of a dicarboxylic acid, with the exception of the compounds of trans-configuration (α-isomers) in which X represents hydrogen.

As acyl groups are to be considered especially those of lower aliphatic monocarboxylic acids having 1 to 12 and preferably 2 to 6 carbon atoms, for example acetic acid, propionic acid, butyric acid, valeric acid, caproic acid and lauric acid. In addition, substituted acyl radicals of aliphatic monocarboxylic acids having 1 to 12 and preferably 1 to 6 carbon atoms, in which preferably only one substituent is present in the acyl radical, namely a halogen, a hydroxyl-, nitro-, alkoxy-, aryloxy-, aryl-, carboxyl-, or carbalkoxy group or a group —COOMe, in which Me represents an alkali metal atom, preferably sodium or potassium, or an $NH_4$-group. As acyl radical is to be considered in particular the acetyl radical and the acyl radical of phenoxy and phenyl acetic acid substituted in the nucleus by chlorine or chlorine and methyl radicals. In addition are to be considered the acyl radicals of unsaturated carboxylic acids, for example crotonic acid and of dicarboxylic acids, for example succinic acid, adipic acid and azelaic acid.

It was found in addition that a special influence on the growth of plants is exerted by compounds of the general formula

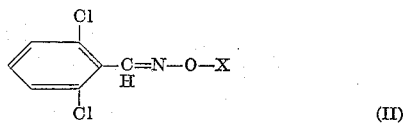

(II)

in which formula X has the above meaning and in particular those in which X represents hydrogen or an acyl radical of an aliphatic monocarboxylic acid having 1 to 12 and preferably 2 to 6 carbon atoms and in addition those in which X indicates a phenoxyacetyl or a phenylacetyl radical, the phenyl radical of which is substituted by one or more chlorine atoms or by one or more chlorine atoms and methyl groups. This holds more in particular for the acetyl-, monochloroacetyl- and caproyloximes and for the 2,4-dichlorophenoxyacetyl-, 2-methyl-4-chlorophenoxyacetyl- and 2,3,6-trichlorophenylacetyloximes of 2,6-dichlorobenzaldehyde and in particular for the β-isomers of these compounds and for β-2,6-dichlorobenzaldoxime.

In general, the β-isomers have a larger influence on the growth of plants than the corresponding α-isomers. Among the compounds according to the invention are the following: β-acryloxime of 2,6-dichlorobenzaldehyde, α-butyroyloxime of 2,6-dichlorobenzaldehyde, β-lauroyloxime of 2,6-dichlorobenzaldehyde, α-crotonoyloxime of 2,6-dichlorobenzaldehyde, α(2,2-dichloropropionyloxime) of 2,6-dichlorobenzaldehyde, β-bromoacetyloxime of 2,6-dichlorobenzaldehyde, α(3-sodium carboxypropionyloxime) of 2,6-dichlorobenzaldehyde, β(3-carboxypropionyloxime) of 2,6-dichlorobenzaldehyde, β(3-carboxyethylpropionyloxime) of 2,6-dichlorobenzaldehyde, β-ethoxyacetyloxime of 2,6-dichlorobenzaldehyde, β(2'-ethoxyethoxyacetyloxime) of 2,6-dichlorobenzaldehyde, β(2', 2''-ethoxyethoxyethoxyacetyloxime) of 2,6-dichlorobenzaldehyde, α,α'(butane-1,4-biscarboxyloxime) of 2,6-dichlorobenzaldehyde, β-acetyloxime of 2-chloro-6-methylbenzaldehyde, α(chloroacetyloxime) of 2-chloro-6-methylbenzaldehyde, α(4'-nitrophenylacetyloxime) of 2-chloro-6-methylbenzaldehyde, α(2,4-dichlorophenoxyacetyloxime) of 2-chloro-6-methylbenzaldehyde, β(2,4-dichlorophenoxyacetyloxime) of 2-chloro-6-methylbenzaldehyde, β-acetyloxime of 2-bromo-6-chlorobenzaldehyde, α(2,4-dichlorophenoxyacetyloxime) of 2-bromo-6-chlorobenzaldehyde, β(ethoxyacetyloxime) of 2-bromo-6-chlorobenzaldehyde, α(carboxyethylpropionyloxime) of 2-bromo-6-chlorobenzaldehyde, β-acetyloxime of 2,6-dibromobenzaldehyde, α-acetyloxime of 2-chloro-6-fluorobenzaldehyde, α(2,4-dichlorophenoxyacetyloxime) of 2-chloro-6-fluorobenzaldehyde, β(2,4-dichlorophenoxyacetyloxime) of 2,6-dichlorobenzaldehyde, β(2,4,5-trichlorophenoxyacetyloxime) of 2,6-dichlorobenzaldehyde, β(2,4,5-trichlorophenoxypropionyloxime) of 2,6-dichlorobenzaldehyde.

The preparation of the new compounds according to the invention may be carried out in manners known per se for oximes and acyl derivatives thereof.

The preparation of an α-benzaldoxime may be carried out by reaction of hydroxylamine or salts thereof, for example hydroxylamine-hydrochloric acid, with a relative benzaldehyde; the preparation of a β-benzaldoxime may be carried out by reaction of a hydroxylamine-monosulphonate or -disulphonate, for example sodium-, potassium- or ammonium - hydroxylamine - mono- respectively disulphonate, with a relative aldehyde.

The preparation of an acyl derivative of a benzaldoxime may be carried out by reaction of the oxime with a carboxylic acid anhydride or a carboxylic acid halogenide. Preferably the reaction with an anhydride is used. As an acid halide there is preferably used an acid chloride. The reaction of an oxime with an acid chloride is preferably carried out in the presence of an acid-binding agent. As such are suitable in particular collidine, for example 2,4,6-collidine, sodium and potassium bicarbonate and -carbonate. Other tertiary bases and sodium and potassium hydroxide may also be used if they are added slowly to the reaction mixture. The pH of the reaction mixture is preferably kept between 5 and 9. As solvents may be used, for example, ether, acetone, methylethylketone, dioxane, aromatic hydrocarbons such as benzene and toluene, aliphatic hydrocarbons such as petroleum ether, halogenated hydrocarbons, for example chloroform and methylene chloride.

The following examples illustrate the invention.

Example 1

*β-2,6-dichlorobenzaldoxime.*—Into a solution obtained from 9.1 g. of sodium nitrite in 100 cm.³ of water of a temperature between —5 and 0° C. and 14 g. of sodium bisulphite, sulphur dioxide was led until acid reaction of the solution. To the thus obtained solution of sodium hydroxylamine-disulphonate was added a mixture of 17.5 gms. of 2.5-dichlorobenzaldehyde in 25 cm.³ of ethanol. The mixture was stirred by means of a vibrating stirrer and heated at 75° C. for 30 minutes. The melted 2,5-dichlorobenzaldehyde passes over into the crystalline β-2,6-dichlorobenzaldoxime. After the addition of 200 cm.³ water, the β-oxime was sucked off, dissolved in ether, the etherial solution was washed with water, dried on anhydrous sodium sulphate, filtered and evaporated.

Yield: 18.9 gms. (99%); melting point: 165–168° C. After crystallization from benzene the melting point was 175–177° C.

Example 2

*β-2,6-dichlorobenzaldoxime acetate.*—5 gms. of the β-2,6-dichlorobenzaldoxime prepared according to Example 1 was heated at 70° C. with 5 cm.³ of acetic acid anhydride. At this temperature, the β-oxime went into solution. After heating at 85–90° C. for 20 minutes, the solution was poured on pieces of ice. First an oil was formed which soon crystallized. The crystallizate was sucked off and air-dried.

Yield: 5.6 gms. (98%). After crystallization from petroleum ether (boiling range 40–60° C.) the melting point was 77–83° C. The substance melted while splitting off acetic acid.

Example 3

*β-Caproyloxime of 2,6-dichlorobenzaldehyde.*—5.7 gms. of β-2,6-dichlorobenzaldoxime obtained according to the method of Example 1 carried out with ammoniumhydroxylamine-disulphonate, was dissolved in 200 cm.³ of dry ether. To the solution was added 4.0 gms. of n. capryl chloride and then while stirring, a solution of 4.0 cm.³ of 2,4,6-collidine in 40 cm.³ of dry ether. After storing for some time at room temperature, the precipitated hydrochloric acid salt of the collidine was sucked off. The filtrate was washed with an ice cold N potassium hydroxide solution, with ice water, with ice cold N hydrochloric acid solution and again with ice water. After drying the ethereal solution over anhydrous sodium sulphate, filtration was carried out and the ether was distilled off. The residue was dissolved in petroleum ether, filtered and cooled to —25° C., after which the crystallized caproyloxime was filtered off. Melting point: 32–36° C.

Example 4

*β(2 - methyl - 4-chlorophenoxy-acetyloxime) of 2,6-dichlorobenzaldehyde.*—5.7 gms. of β-2,6-dichlorobenzaldoxime obtained according to the method of Example 1 carried out with potassium hydroxylamine-sulphonate was dissolved in 200 cm.³ of dry acetone. 7.0 gms. of 2-methyl-4-chlorophenoxy-acetyl-chloride was added and then, while stirring, a solution of 4.0 cm.³ of 2,4,6-collidine in 30 cm.³ of acetone. After stirring at room temperature for 30 minutes, the formed hydrochloric acid salt of the collidine was sucked off. The acetonic solution was successively washed with ice cold 0.5 N hydrochloric acid and 0.5 N potassium hydroxide solution. After drying on anhydrous sodium sulphate, the acetonic solution was filtered and evaporated at reduced pressure. The residue was crystallized from petroleum ether (boiling range 60–80° C.). Yield: 7.1 gms. (64%). Melting point: 85–95° C. After crystallization from methanol the melting point was 100–102° C.

Example 5

*β(2,3,6 - trichlorophenylacetyloxime) of 2,6-dichlorobenzaldehyde.*—3.8 gms. of β-2,6-dichlorobenzaldoxime obtained according to the method of Example 1 was dissolved in 100 cm.³ of dry ether. To the solution was added 5.16 gms. of 2,3,6-trichlorophenylacetylchloride and then 2.7 gms. of powdered sodium bicarbonate. After leaving to stand for some time, the separated sodium chloride and the sodium bicarbonate were filtered off, the filtrate was washed with 0.5 N hydrochloric acid, dried on anhydrous sodium sulphate, filtered, and evaporated. After crystallization from heated methanol, the abovementioned acetyloxime was obtained of melting point 158–160° C.

Example 6

*β(chloroacetyloxime) of 2,6-dichlorobenzaldehyde.*—3.36 gms. of β-2,6-dichlorobenzaldoxime obtained according to the method of Example 1 was dissolved, together with 2.0 gms. of chloroacetylchloride, in 40 cm.³ of benzene. 1.7 gms. of potassium carbonate was portionwise added to the solution. Gas development occurred. After the addition, the reaction mixture was left to stand for some time at room temperature. The separated potassium chloride and the unchanged potassium carbonate were filtered off, the filtrate was evaporated and the resulting residue was washed with hot petroleum ether (boiling range 40–60° C.). Yield: 3 gms. (64%). Melting point: 92–95°– C. After crystallization from petroleum ether (boiling range 40–60° C.), a product of melting point 99.5–101° C. was obtained.

Example 7

*α(2-methyl-4-chlorophenoxyacetyloxime) of 2,6-dichlorobenzaldehyde.*—5.7 gms. of α-2,6-dichlorobenzaldoxime, obtained by reaction of 2,6-dichlorobenzaldehyde with hydroxylamine, was dissolved in 200 cm.³ of dry dioxane. After the addition of 7.0 gms. of 2-methyl-4-chlorophenoxyacetylchloride, a solution of 4.0 gms. of 2,4,6-collidine in 50 cm.³ of dry ether was added while stirring. The resulting precipitate of the hydrochloric acid salt of collidine was filtered off after refluxing for 15 minutes and leaving to stand at room temperature for some time. After evaporation (under reduced pressure) of the filtrate, the resulting residue was washed with cold petroleum ether (boiling range 40–60° C.). Yield: 8.6 gms. (77%). Melting point: 98–100° C. After crystallization from petroleum ether (boiling range 60–80° C.), a product of melting point 102–104° C. was obtained.

*Example 8*

α(2,3,6-trichlorophenylacetyloxime) of 2,6:dichlorobenzaldehyde.—5.7 gms. of α-2,6-dichlorobenzaldoxime, obtained by reaction of 2,6-dichlorobenzaldehyde with hydroxylamine, was dissolved in 20 cm.³ of methylethylketone. 7.7 gms. of 2,3,6-trichlorophenylacetylchloride was added to the solution and then, while stirring, a solution of 4.0 cm.³ of 2,4,6-collidine in 50 cm.³ of dry ether. After leaving to stand for some time at room temperature, the precipitate, consisting of the product to be prepared and the hydrochloric acid salt of collidine, was sucked off and washed with water to remove said hydrochloric acid salt. The remaining precipitate was crystallized from ethanol. Yield: 5.6 gms. (45%). Melting point: 160–162° C.

*Example 9*

α(2,4-dichlorophenoxyacetyloxime) of 2,6-dichlorobenzaldehyde.—5.7 gms. of α-2,6-dichlorobenzaldoxime, obtained by reaction of 2,6-dichlorobenzaldehyde with hydroxylamine, was dissolved in 150 cm.³ of dry ether. Added was 7.2 gms. of 2,4-dichlorophenoxyacetylchloride and then, while stirring and in 30 minutes, a solution of 4.0 cm.³ of collidine in 50 cm.³ of dry ether. After storing for some time at room temperature, the hydrochloric acid salt of collidine was sucked off, the filtrate was washed successively with ice cold N hydrochloric acid solution and an aqueous of sodium bicarbonate. After drying the etherial solution on anhydrous sodium sulphate, filtration and evaporation at reduced pressure were carried out. Residue: 8.5 gms. After crystallization from methanol, a product of melting point 117–119° C. was obtained.

*Example 10*

β-2,6-dichlorobenzaldoxime.—Into a solution of 552 gms. of sodium nitrite in 4120 cm.³ of 2 N sodium hydroxide solution approximately 1075 gms. of sulphur dioxide were led. The temperature of the mixture was kept between 0 and 5° C. After storing for some time (while stirring) at well over 30° C., a mixture of 1450 cm.³ of ethanol and 1000 gms. of 2,6-dichlorobenzaldehyde was added to the solution of the thus formed sodium hydroxylamine-monosulphonate. The resulting mixture was stirred at approximately 70° C. for one hour. Then the reaction mixture was poured into water. The precipitated β-2,6-dichlorobenzaldoxime was filtered off, washed with water and dried. Yield: 1080 gms. After crystallization from benzene, 860 gms. of substance was obtained. Melting point: 175–176° C. Yield: 80%.

The influence of the compounds according to the invention on the growth of plants was tested in experiments as described in H. Koopman, "Nieuwe herbicide 1,3,5-triazinederivaten," thesis, Groningen, 1957, pages 54–58. As experimental plants were used dwarf bean, tomato, oats, chickweed, beet, millet and garden-cress. In general, the compounds turned out to inhibit the growth of the plants. The phenoxy-acetic acid and phenyl-acetic acid derivatives showed growth hormone-activity which appeared from the occurrence of leaf modifications and of curvatures of stems and leaf-stalks of the plants. A number of compounds also showed herbicidal activity. A high herbicidal activity is exerted in particular by α- and β-2,6-dichlorobenzaldoxime acetate, β-2,6-dichlorobenzaldoxime caproate and β-2,6-dichlorobenzaldoxime. The herbicidal activity was observed inter alia in experiments in which the roots of young oat plants were sprayed with solution or suspensions of the substances and also in experiments in which the surface of the ground in which garden-cress had been sowed was sprayed with those solutions or suspensions. Even with a quantity of substance corresponding to 1 kg. per ha., a significant hermicidal activity was observed. Of the β-2,6-dichlorobenzaldoxime caproate, the "vapour effect" was also determined. For that purpose, 1 and 3 mg. respectively of substance was brought on a filter paper by means of a solution of the substance and this paper was attached to the top of a bell-glass under which young oat plants were growing. Especially in plants in sand there appeared to be a large herbicidal activity by "vapour effect," in those in clay, the activity was slighter.

As stated above, the β-isomers generally have a stronger influence on the growth of plants than the corresponding α-isomers.

The active compounds may in various manners be processed to a product ready for use. Some possible processing forms are:

(a) Spraying powders with 25 to 80%, for example 50%, of active substance and in addition moistening agents, such as fatty alcohol sulphates or alkylaryl-sulphonates, as well as dispersing agents, such as lignine-sulphonates and carriers, such as kaolin, chalk, pipeclay, dolomite and attapulgite.

(b) Miscible oils with 5 to 30% and preferably 5 to 10% of active constituent, 5 to 10% of ionogenic or non-ionogenic emulsifier or mixtures thereof and for the rest solvents (principally aromatic hydrocarbons, for example benzene, toluene, or xylene, mixed with aliphatic or aromatic ketones, such as acetone and cyclohexanone).

(c) Dusts with 0.1 to 2%, for example 0.5%, of active substance, on a mixture or kieselguhr and dolomite marl and in addition, if desired, provided with wetting agents.

(d) Solutions of the active substance in organic solvents, such as aromatic hydrocarbons or aliphatic or aromatic ketones or mixtures thereof.

What is claimed is:

1. A method of destroying undesired plant life comprising applying to the undesired plants a herbicidal composition containing a herbicidally effective amount of a compound of the structural formula:

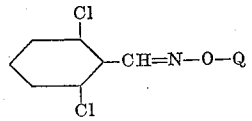

wherein Q is the acyl radical of an aliphatic monocarboxylic acid containing from 2 to 6 carbon atoms.

2. A method of destroying undesired plant life comprising applying to the undesired plants a herbicidal composition containing a herbicidally effective amount of 2,6-dichlorobenzaldoxime acetate.

3. A method of destroying undesired plant life comprising applying to the undesired plants a herbicidal composition containing a herbicidally effective amount of 2,6-dichlorobenzaldoxime caproate.

4. A method of destroying undesired plant life comprising applying to the undesired plants a herbicidal composition containing a herbicidally effective amount of the 2,4-dichlorophenoxy-acetyloxime of 2,6-dichlorobenzaldehyde.

5. A method of destroying undesired plant life comprising applying to the undesired position containing a herbicidally effective amount of the 2-methyl-4-chlorophenoxyacetyloxime of 2,6-dichlrobenzaldehyde.

6. A method of destroying undesired plant life comprising applying to the undesired plants a herbicidal composition containing a herbicidally effective amount of the 2,3,6-trichlorophenylacetyloxime of 2,6-dichlorobenzaldehyde.

7. A method of destroying undesired plant life comprising applying to the undesired plants a herbicidal composition containing a herbicidally effective amount of β-2,6-dichlorobenzaldoxime.

References Cited in the file of this patent

FOREIGN PATENTS 824,534     Great Britain _____ Dec. 2, 1959

OTHER REFERENCES

Meisenheimer et al.: Ann., vol. 495, pp. 249–283 (1932).

Hauser et al.: J. A. C. S., vol. 63, pp. 1224–1227 (1941).

Thompson et al.: "Botanical Gazette," vol. 107, 1946, pages 475–507, page 498 of special interest.

Meisenheimer et al.: Annalen der Chemie, B and 495, pages 254 and 255 (1932).

UNITED STATES PATENT OFFICE
CERTIFICATE OF CORRECTION

Patent No. 3,165,392 January 12, 1965

Harmannus Koopman

It is hereby certified that error appears in the above numbered patent requiring correction and that the said Letters Patent should read as corrected below.

Column 1, line 45, for "effecting" read -- affecting --; column 5, line 42, after "aqueous" insert -- solution --.

Signed and sealed this 17th day of August 1965.

(SEAL)
Attest:

ERNEST W. SWIDER
Attesting Officer

EDWARD J. BRENNER
Commissioner of Patents